June 20, 1950        A. HANSEN, JR        2,512,325
HALL EFFECT COMMUTATING APPARATUS Filed May 25, 1949        2 Sheets-Sheet 1

Inventor:
Albert Hansen Jr.,
by Princell P Mack
His Attorney.

June 20, 1950  A. HANSEN, JR  2,512,325
HALL EFFECT COMMUTATING APPARATUS
Filed May 25, 1949  2 Sheets-Sheet 2

Inventor:
Albert Hansen Jr.,
by Prancell S. Mack
His Attorney.

Patented June 20, 1950

2,512,325

UNITED STATES PATENT OFFICE 2,512,325

HALL EFFECT COMMUTATING APPARATUS

Albert Hansen, Jr., Lynn, Mass., assignor to General Electric Company, a corporation of New York Application May 25, 1949, Serial No. 95,190

10 Claims. (Cl. 171—252)

Figure 2:
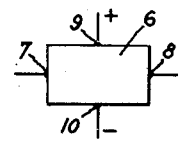
Figure 3:
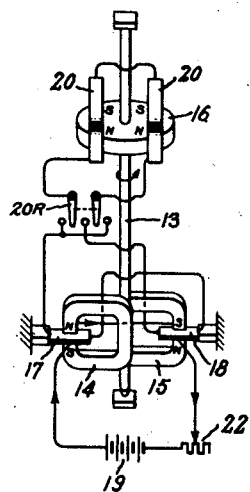
Figure 4:
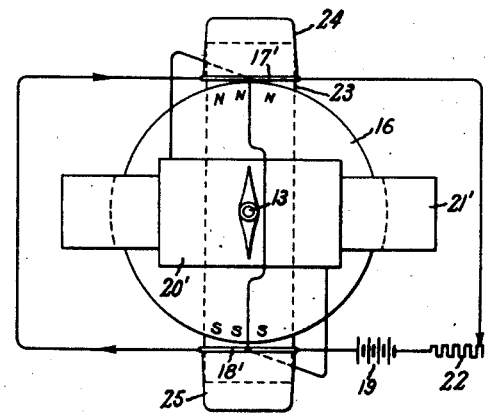
Figure 5:
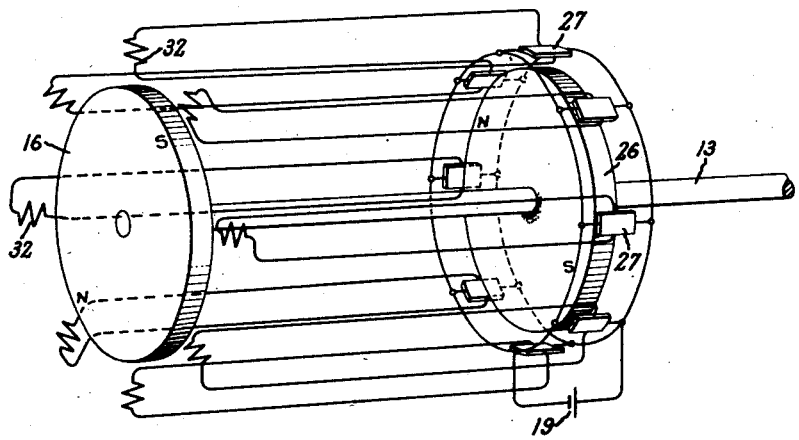
Figure 6:
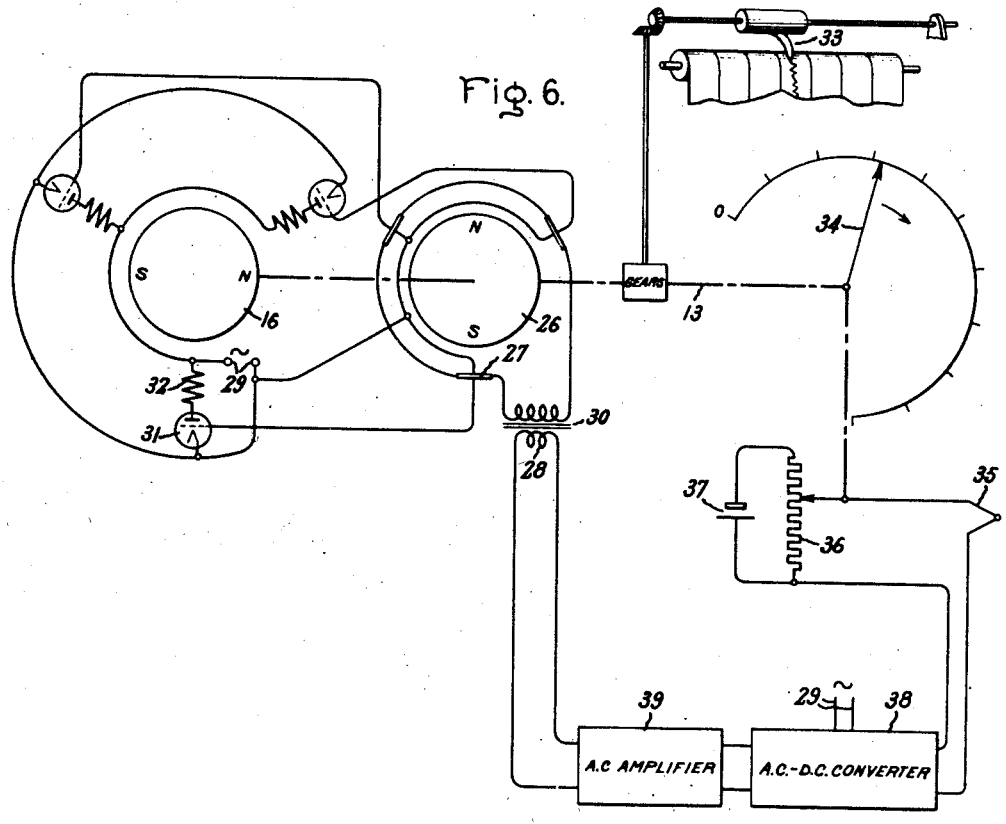

My invention relates to Hall effect commutating methods and means for dynamoelectric apparatus such, for example, as generators and motors, whereby the use of the conventional brush and commutator arrangement is dispensed with and the necessary commutation accomplished without moving make and break contacts. The invention appears to have a rather broad field of use and its application to several types of dynamoelectric machines will be explained in connection with the accompanying drawing which shows in Fig. 1 a direct current generator. Fig. 2 is a plan view of one of the Hall plates used in Fig. 1. Fig. 3 represents a form of direct current motor embodying my invention. The permanent magnets of the motor of Fig. 3 are combined in a single magnet in Fig. 4. Fig. 5 is a schematic illustration of a motor which in principle is like Fig. 3 but provided with many Hall plates and field coils. Fig. 6 represents my invention applied to a motor device supplied with alternating current but having the characteristics of a direct current motor, and wherein amplifiers are employed in the electrical connections between the Hall plates and field coils of the motor.

The features of my invention which are believed to be novel and patentable will be pointed out in the claims appended hereto.

Figure 1:
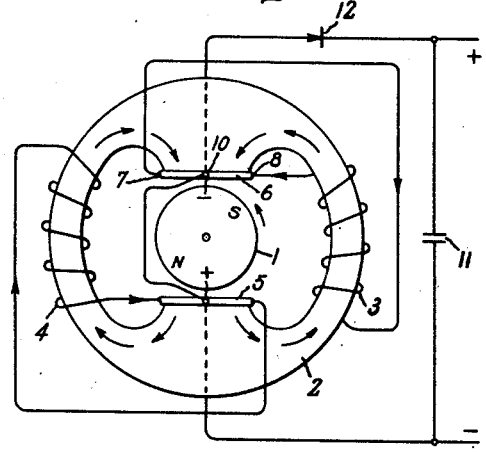

Referring now to Fig. 1, I represents a rotary cylindrical shaped permanent magnet assumed to be driven by some motor means, not shown. The magnet I is polarized across a diameter and thus constitutes a two-pole rotor. This rotor rotates in the air gap of a two-pole stator magnet 2 having coils 3 and 4 thereon. Extending across the faces of the stator pole pieces, and between such pole faces and the rotor I, is a pair of Hall plates 5 and 6 such that any flux crossing the air gap between stator and rotor also passes through such Hall plates. The pole faces and Hall plates are of rectangular shape and of the same or approximately the same area, and the Hall plates have terminals at the centers of their four edges as shown in Fig. 2. The upper Hall plate 6 is connected in series with the coil 3 through the long axis of such plate, using the end terminals 7 and 8. The lower Hall plate 5 is similarly connected in series with the coil 4. The other terminals of the Hall plates, namely, those at the sides such as terminals 9 and 10, are connected in series to output terminals marked + and −, and in such a direction that the output Hall plate voltages to be explained will add.

It is known that a plate of certain materials such, for example, as germanium or bismuth, when cut by a field flux through their thin dimension and threaded by a current through one axis of its plane, will produce a voltage across the other axis of its plane at right angles to the input current axis. This is known as the Hall effect.

Thus, in Fig. 2, if the flat plate 6, assumed to be of germanium, is cut by a flux at right angles to its plane and to the plane of the paper and by a current between terminals 7 and 8, a voltage will appear across terminals 9 and 10. If the flux and input currents be unidirectional, the output voltage will be unidirectional. If the input flux and current both reverse in synchronism and in phase, the output voltage will be unidirectional. If either the input current or flux be alternating while the other is unidirectional, the output voltage will be alternating. The output voltage will be proportional to the product of input current and flux except in the case where the input current and flux are alternating, in which case the output voltage will be proportional to the inphase component of input flux and current.

Assume now that the rotor I of Fig. 1 be rotated by some motor means, not shown. When its poles are aligned with the stator pole pieces, the flux of the permanent magnet rotor will find parallel paths through the yokes and coils 3 and 4 of stator 2 and will induce currents in such coils, which currents will flow between the input current terminals of the Hall plates such as terminals 7 and 8 of plate 6, Fig. 2, and produce voltages at the output terminals of the Hall plates such as the terminals 9 and 10 of plate 6, Fig. 2. It is to be noted that the flux performs a double function in that it produces the field for the Hall plates simultaneously with the induction of current in the coils 3 and 4. Hence, the output voltages of the Hall plates are proportional to the product of flux and Hall plate input current. When the south pole of the rotor is opposite Hall plate 6, the direction of flux and input Hall plate current may be assumed to correspond to the directions indicated by arrows in Fig. 1. Then the output voltages of the Hall plates will be as represented by the polarity marks adjacent the output terminals, since the flux is down through both Hall plates while the input currents are to the left in plate 6 and to the right in plate 5. It is seen that the Hall plate and rotating magnetic field perform a commutating function for the apparatus when the field is rotated.

As with most generators, various modifications are possible. For example, the number of poles may be varied, and the two circuits comprising the plate 6 and coil 3 and the circuit containing the plate 6 and coil 4 may be connected in series. The two output voltage circuits may be connected in series or parallel. Compounding may be effected by amplifying the output in the manner illustrated in Fig. 6 and feeding such amplified output through additional coils on the stator magnetic circuit 2.

In Fig. 3, I have represented the application of my invention to a direct current motor. A rotary shaft 13 carries a pair of horseshoe shaped commutating permanent magnets 14 and 15 near its lower end and a cylindrical driving permanent magnet 16 near its upper end. The permanent magnets are polarized as indicated. The air gaps of the magnets 14 and 15 are located in a plane at right angles to the axis of rotation, and such gaps are equally distant from the axis of rotation. Cooperating with the magnets 14 and 15 is a pair of Hall plates 17 and 18 which are stationary and positioned diametrically opposite each other and in the plane and radius of the air gaps of such magnets such that as the magnets rotate, the Hall plates will be alternately cut by the flux of such magnets, and plate 17 will be cut by the flux of magnet 14 when plate 18 is being cut by the flux of magnet 15 and vice versa. The Hall plates are energized in series by a direct current from a source 19 through their current input terminals as explained for the terminals 7 and 8 of Fig. 2. Hence, when cut by the fluxes of the permanent magnets 14 and 15, output voltages will appear at their voltage output terminals corresponding to the terminals 9 and 10 of Fig. 2. Since the two permanent magnets 14 and 15 have reversed polarity with respect to each other, the output voltages of the Hall plates will reverse in polarity once each revolution of the magnets. The output terminals of the Hall plates are connected in series in adding relation to a winding 20 divided into two coils and embracing the cylindrical motor torque permanent magnet 16. The output of the Hall plates is thus utilized to energize the stator field of the motor and will produce a field across the diameter of the rotor permanent magnet 16, the polarity of which field will reverse with the reversal of the output of the Hall plates. The flux axes of the stator and rotor of the motor end of this device are arranged to be 90 degrees out of rotary alignment at the times when the Hall plates are producing their maximum outputs. Thus, in Fig. 3, the Hall plates are within the air gaps of the magnets 14 and 15 and hence producing their maximum outputs, while the flux axes of stator winding 20 and rotor magnet 16 are 90 degrees displaced. At this time the stator winding 20 will be energized and its field will produce a torque on rotor 16 in a given direction, and the device will run as a motor in such direction.

If the opposite direction of rotation is desired, the necessary reversal in connections is made; for example, that of winding 20 by means of the reversing switch indicated at 20R.

As the rotor 16 rotates in response to the torque thus created, the commutating magnets 14 and 15 pass beyond the Hall plates and the output current, and energization of winding 20 decreases to zero value just as the polar axis of rotor 16 arrives in line with the flux axis of stator winding 20, but the momentum produced causes the rotor to rotate farther until the Hall plates again start to be cut by flux from magnets 14 and 15 but in a reverse direction. Hence, winding 20 receives a reverse current which builds up to a maximum value when magnet 14 has rotated 180 degrees from the position shown. This condition produces another motor torque impulse in the same direction as before because in the meantime the polarity of the stator winding 20 has reversed. Thus, there is provided a direct current motor without the conventional brush and segmental commutator arrangement or any other other form of make and break contact device, but with the function of the conventional commutating device performed by the Hall plates and permanent magnets. The speed may be varied by adjusting the energizing current as by the adjustable resistance at 22, which may also be used as a motor energizing switch. Here again the Hall plates and rotating field magnets 14 and 15 perform the commutating function of the apparatus.

A single rotary permanent magnet may be used to perform the functions of rotary permanent magnets 14, 15 and 16 of Fig. 3. This is represented in Fig. 4 where 16 is a permanent magnet cylindrical rotor corresponding to this element in Fig. 3 and mounted on a shaft 13, and 20' corresponds to the motor energizing winding but in Fig. 4 it is contained on U-shaped mangetic circuit 21'. A second horseshoe-shaped magnetic yoke 23 is provided in Fig. 4 having pole pieces 24 and 25 adjacent the polarized rotor 16 on an axis 90 degrees from the axis of the motor stator 21'. Hall plates 17' and 18' are provided across the pole faces of yoke 23 between such pole faces and the adjacent polarized rotor 16 such that such Hall plates will be cut by the rotor flux and the yoke 23 will serve as an efficient return path for the rotor flux when the polarized axis of the rotor is aligned with the pole pieces 24 and 25 as indicated in Fig. 4. The principle of operation of this motor is the same as that of Fig. 3.

In Fig. 5 there is a representation of a motor in principle similar to Fig. 3 but provided with pairs of Hall plates and motor driving field coils in excess of the number of pairs of poles in the rotor structure. A stator magnetic circuit for the motor field coils may be provided but is omitted for the sake of more clearly representing the principle. Motor shaft 13 and its two-pole motor rotor 16 correspond to like numbered parts in Fig. 3. A separate disk two-pole polarized rotor magnet 26 on shaft 13 is used for producing flux through the Hall plates 27 arranged in a circle and uniformly spaced about rotor magnet 26. The current input terminals of the Hall plates are connected in parallel to a direct current source 19, and the output terminals of the Hall plates are individually connected to the motor torque coils 32 which are uniformly spaced about the periphery of the motor driving rotor magnet 16. In the device illustrated, the rotor magnets are two-pole and there are eight Hall plates and motor driving coils. The flux axes of the rotor magnets are angularly spaced by 90 degrees, while there is no angular spacing between the motor torque coils and the Hall plates from which energized. Hence, the diametrically opposite pair of Hall plates which are cut by flux from rotor magnet 26 at any instant will energize a pair of diametrically opposite motor torque coils 90 degrees spaced from the flux axis of motor rotor 16. Such pairs of coils are wound or connected to their Hall plates to produce opposite poles and hence will produce torques in the same direction on rotor 16, causing the motor to rotate in such direction. Similarly, the remaining pairs of diametrically opposite Hall plates and motor coils are arranged to produce torques in the same direction. As the rotor rotates, the several pairs of Hall plates will produce output currents in progressive rotation, thereby energizing pairs of motor torque coils in progressive rotation all producing torque in the same direction. Such a multipolar arrangement of the Hall plates and torque coils as compared to the rotor pole number is less likely to develop low torque or dead spots at certain rotor positions than is the case in Fig. 3.

In Fig. 5 the rotor field magnet fluxes effectively overlap at least three pairs of adjacent Hall plates and motor torque coils. Hence, at least three pairs of such Hall plates and their connected pairs of motor torque coils are effective in producing torque simultaneously in an overlapping and progressive fashion, and approximately three-fourths of the rotor periphery at both ends of the structure is in effective use all of the time. It will be obvious that by interspacing Hall plates and motor field coils about the same bipolar rotor magnet, the motor of Fig. 5 may be reconstructed to have the form of the motor of Fig. 4.

The Hall plate motor driving output may be amplified before being used to energize the motor, and the embodiment of a motor including this feature is schematically illustrated in Fig. 6 in the form of a servomotor receiving its initial and controlling energization from a relatively feeble error signal current source 28, which may be an alternating current which may change in magnitude and phase relation with respect to a reference alternating current voltage to control the extent and direction of operation of the motor.

In Fig. 6 the polarized two-pole rotor 26 and the Hall plates, such as 27 shown adjacent thereto, represent the commutating apparatus. The polarized two-pole rotor 16 and the field coils shown adjacent thereto, such as coil 32, represent the motor torque apparatus. The field coils are supplied from an alternating current source 29 through individual amplifying tubes. There are three Hall plates, amplifying tubes and field coils shown, and the Hall plates and field coils are grouped 120 degrees apart about their respective rotor elements. The three tubes are individually biased by the output voltages of the three Hall plates, and the field coils are fed by tubes controlled by Hall plates which have corresponding positions. Thus, lower field coil 32 is fed through tube 31 controlled by the output voltage of the lower Hall plate 27. The current input circuits of the three Hall plates are supplied in series or in parallel from the signal voltage source 28 through a transformer 30 which may serve to step up the voltage or be used for impedance matching as may be desirable. It will be evident that each Hall plate tube and field coil group will function in the same manner under any given condition except rotor position. Hence, it will be sufficient to explain the operation of one group, such as the lower group, consisting of Hall plate 27, tube 31 and field coil 32, and in such explanation it will be assumed, first, that the other groups are not present. It is further assumed that the alternating current voltage sources 28 and 29 are of the same frequency and relate back to a common source, but that the error signal source 28 may shift or reverse in phase relation with respect to source 29 and vary in magnitude in response to a condition to be controlled, measured, recorded, etc. by the servomotor. The input current of Hall plate 27 is alternating and the field therethrough from rotor magnet 26 is unidirectional for a stationary condition of the rotor. The output voltage of the Hall plate will be alternating and, hence, its phase position relative to voltage 29 will determine whether or not tube 31 passes current. The magnitude of the current through field coil 32 will also depend to some extent on the magnitude of the voltage bias and the input current of Hall plate 27 and voltage 28.

The rotor position represented in Fig. 6 will be referred to as rotor position 1, and it will be assumed that for this position and an error signal voltage 28 which is in phase with voltage 29, tube 31 passes current and field coil 32 produces a north pole adjacent the rotor 16. This condition will thus produce a counterclockwise torque on the rotor 16 in position 1 as given in line 1 of the following table.

| Line | Rotor Position | Phase of 29 | Phase of 28 | Field Coil 32 Rotation Torque |
|---|---|---|---|---|
| 1 | 1 | 0 | 0 | CCW |
| 2 | 1 | 0 | 180 | 0 |
| 3 | 1+90° CCW | 0 | 0 | 0 |
| 4 | 1+180° CCW | 0 | 0 | 0 |
| 5 | 1+270° CCW | 0 | 0 | 0 |
| 6 | 1+180° CCW | 0 | 180 | CW |

In the above table the motor torque is zero for the condition of line 2 because tube 31 does not pass current, as the supply voltage 31 and bias voltage are now 180 degrees out of phase. The conditions of lines 3 and 5 of the table will produce no torque from field coil 32 because with the rotor turned 90 degrees in either direction from position 1, no flux passes through the Hall plate 27. Torque will exist for the condition of line 6 because here both the phase of the input voltage and flux through the Hall plate have been reversed as compared to line 1 of the table, so that tube 31 passes current, but the torque is now clockwise because the north and south pole positions of rotor 16 will be reversed. There will of course be a variety of other conditions more or less approaching these of lines 1 and 6 of the table as to phase relation and rotor position productive of lesser CCW and CW torques down to zero values.

The torques referred to in lines 1 and 6 of the table will be torque pulses every half cycle of the alternating current voltage and will be generally of a sine wave shape and in order to produce continuous rotation of the motor with only one field coil, they should be sufficient to cause the rotor to coast through the nontorque producing region which will extend over a maximum of 180 degrees rotor position for an inphase or 180 degrees out-of-phase condition of the voltages 29 and 31, and the single plate and field coil apparatus first assumed. Such idle or nontorque producing rotor position is avoided by providing the additional group of Hall plates, tubes and field coils so that there is no idle or torqueless rotor position when any tube is passing current. Thus, with all groups of elements present, there will be clockwise torque for the conditions otherwise represented in lines 2 and 6 of the table, and counterclockwise torques for the conditions otherwise represented in lines 1, 3, 4, and 5 of the table.

It will now be evident that a reversal in phase of the signal voltage 28 relative to the voltage 29 will reverse the motor; also, that the speed of the motor will vary with the magnitude of the signal voltage and if the signal voltage is of a character that shifts in phase angle gradually instead of an abrupt 180-degree reversal, the motor speed will decrease as the phase relation of 28 departs from an exact inphase or 180 degrees out-of-phase relation with respect to voltage 29.

As pointed out previously, the apparatus of Fig. 6 may be combined in a single polarized rotor device, and a greater or lesser number of Hall plates and field coil groups may be had. The combination of Fig. 6 is a direct current motor supplied by alternating current in which both commutation and rectification functions are performed without moving contacts.

One application of the use of the servomotor of Fig. 6 is indicated more or less schematically. The motor is shown for operating a recorder 33 and an indicator 34 for the purpose of recording and indicating the temperature as measured by a thermocouple 35. The servomotor also rebalances the potentiometer at 36 through which the voltage of the thermocouple is compared to a voltage from a standard cell 37. The error signal 28 corresponds to any difference in the voltage of the thermocouple and a variable voltage from potentiometer 36. This voltage difference, if any, is converted to alternating current by a suitable D.-C. to A.-C. converter at 38, having as a source of power supply the A.-C. source 29 which supplies the amplifier tubes 31 of the motor. The A.-C. output of converter 38 is amplified, if necessary, by an A.-C. amplifier 39 and fed to transformer 30. The converter-amplifier combination 38—39 will be a type sensitive to polarity and magnitude of the D.-C. input signal voltage, such that the motor of Fig 6 drives the recorder 33, and the indicator 34, and adjusts the potentiometer 36 to record and indicate the temperature variations of the thermocouple 35 and to rebalance the potentiometer in a direction to reduce the error signal to zero. After a rebalancing operation the motor stops until another change in temperature occurs. Aside from the motor of Fig. 6, the parts referred to in such figure are more or less conventional and are not a part of the present invention.

The dimensional and other data to be used in constructing and designing such apparatus as has been described will depend in a large measure on its intended use, and the designer after knowing what output or result is desired may compute the design data in accordance with the electrical and magnetic principles used.

Operative devices corresponding to Figs. 1 and 3 have been built. They were for developmental purposes for the demonstration of the principles employed, and the data concerning them do not necessarily represent the best design. In constructing the devices of both Figs. 1 and 3, Hall plates were employed made of germanium and having dimensions ¼" x ¼" x .025". The magnet rotor 1 of the developmental device built in accordance with Fig. 1 was an alloy of copper, nickel, and cobalt, commonly known by the name cunico, 1" in diameter and ⅜" long. The laminated stack 2 was made of silicon steel and was ¼" thick and approximately 2" in outside diameter. The field strength through the Hall plates 5 and 6 was approximately 1000 gauss. The coils 3 and 4 were each of approximately 1000 turns of .010" wire.

In building the device of Fig. 3, existing C-shaped watthour meter drag magnets were used at 14 and 15. These magnets were about 1⅛" outside diameter and had a field strength of approximately 4000 gauss. The magnet 16 of Fig. 3 was made of permanent magnet material, known commercially as Alnico V, and was 1½" in diameter and .060" thick. The coils 20 were each of 2500 turns of .005" wire. This motor ran at approximately one revolution per second with an input of .090 watt.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Dynamoelectric apparatus comprising a rotary field member having uniformly spaced magnetic poles of opposite polarity, a stationary Hall plate positioned adjacent said rotary field member so as to be cut by flux therefrom when a magnetic pole of such field member rotates past such Hall plate, said Hall plate having a pair of input terminals and a pair of output terminals, a stationary field winding for said apparatus in inductive relation to the magnetic poles of the rotary field member thereof which relation is varied by rotation of said field member, and electrical connections between said stationary field winding and one of said pair of Hall plate terminals, said Hall plate and rotary field member performing a commutating function for said apparatus when the field member is rotated.

2. A dynamoelectric machine comprising a rotary field member having uniformly spaced magnetic poles of opposite polarity, a plurality of stationary Hall plates uniformly spaced about and positioned adjacent said rotary field member so as to be cut by the flux of said field member when the latter rotates, a stationary field winding in inductive relation to said rotary field member, said Hall plates having output terminals connected with said field winding, and input terminals for supplying said machine with controlling electric energy through said Hall plates.

3. An electric motor comprising a rotary member providing a plurality of uniformly spaced magnetic poles of opposite polarity, a stationary field winding adjacent said rotary member which when properly energized reacts with the magnetic poles of said rotary member to produce driving torque thereon, and means for supplying driving torque current impulses to said field winding including a plurality of stationary Hall plates positioned adjacent said rotary member so as to be cut by fluxes therefrom when said member rotates, said Hall plates having input and output terminals, connections for supplying electric energy to the Hall plate input terminals, and electrical connections between the Hall plate output terminals and said field winding.

4. An electric motor comprising a stationary field winding member and a rotary magnetic field member in cooperating relation, a source of supply for said motor, and means for commutating the supply of energy to said field winding member for motor torque purposes including a plurality of stationary Hall plates in cooperative relation with said rotary magnetic field member so as to be cut by fluxes therefrom when said rotary magnetic field member rotates, input supply terminals for said Hall plates, and output terminals for said Hall plates electrically connected with said field winding member.

5. An electric motor comprising a stationary field winding member and a plurality of stationary Hall plates, a rotor member having permanent magnet means providing uniformly spaced magnetic poles of opposite polarity in torque producing cooperative relation with said stationary field winding member and uniformly spaced magnetic poles of opposite polarity in flux cutting relation with said Hall plates, said rotary member being in a torque producing angular relation with respect to said stationary field winding member when said Hall plates are cut by the maximum flux, said Hall plates having energizing current input terminals and output terminals, and electrical connections between said output terminals and said field winding member.

6. An electric motor comprising a plurality of stationary field windings and a plurality of stationary Hall plates, said field windings and Hall plates each being uniformly spaced in circular formation, a rotor having permanent magnet means producing uniformly spaced magnetic poles of opposite polarity in torque producing cooperative relation with said field windings and uniformly spaced magnetic poles of opposite polarity in flux cutting relation with said Hall plates, the number of magnet poles of such rotor being less than the number of field windings and Hall plates, input terminals on said Hall plates for supplying the same with energizing currents, and output terminals on said Hall plates selectively connected in energizing relation with said field windings such that each field winding receives maximum energization when in torque producing relation with the rotor magnetic poles.

7. An electric motor comprising a plurality of stationary field windings and a plurality of stationary Hall plates, a rotary member having permanent magnet means for producing magnetic poles in cooperative inductive relation with said field windings and magnetic poles in flux cutting relation with said Hall plates, said relations varying with rotation of said rotor, said Hall plates having input terminals for energization from an external source of supply and output terminals in electrical connection with said field windings, and amplifying means included in said last-mentioned connections.

8. An electric motor including a stationary field winding means and a pair of stationary Hall plates, a rotor having a unitary permanent magnet for producing uniformly spaced magnet poles of opposite polarity cooperating in inductive relation with said stationary field winding means and in flux cutting relation with said Hall plates, said relations varying with rotation of said rotor, said Hall plates having input terminals connected together for energization from a common source of supply, and output terminals connected to control the energization of said field winding means such that the latter is intermittently energized in torque producing commutating relation with respect to the rotor when the latter rotates.

9. An electric motor comprising a plurality of stationary field windings, a plurality of stationary Hall plates, a rotor having permanent magnet means for producing uniformly spaced magnetic poles of opposite polarity in cooperative torque producing relation with said field windings and uniformly spaced magnetic poles of opposite polarity in flux cutting relation with said Hall plates, such relations varying with rotation of said rotor, input terminals for said Hall plates connected together for energization from a common source of alternating current signaling current, output terminals for said Hall plates selectively connected to said stationary field windings, amplifier means in each of said last-mentioned connections, and a source of alternating current of the signaling current frequency for supplying said amplifiers.

10. An electric motor comprising a plurality of stationary Hall plates, a rotary member having means thereon for producing a plurality of uniformly spaced magnet poles of opposite polarity and so located relative to said Hall plates that each of the latter is cut by flux in succession by the successive magnetic poles of said rotary member when the latter rotates, said Hall plates having input and output terminals, a source of supply for energizing said Hall plates through their input terminals, stationary electromagnetic field means positioned adjacent said magnetic pole rotary member and cooperating therewith to produce motor driving torque, and connections for energizing said stationary electromagnetic field means in response to output voltages from said Hall plates.

ALBERT HANSEN, Jr.

No references cited.